(12) United States Patent
Wolfe et al.

(10) Patent No.: US 6,996,643 B2
(45) Date of Patent: Feb. 7, 2006

(54) METHOD OF VME MODULE TRANSFER SPEED AUTO-NEGOTIATION

(75) Inventors: Sarah M. Wolfe, Scottsdale, AZ (US); Jeffrey M. Harris, Chandler, AZ (US); Malcolm J. Rush, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 27 days.

(21) Appl. No.: 10/836,706

(22) Filed: Apr. 29, 2004

(65) Prior Publication Data

US 2005/0256989 A1 Nov. 17, 2005

(51) Int. Cl.
G06F 13/42 (2006.01)
G06F 13/20 (2006.01)
G06F 5/06 (2006.01)

(52) U.S. Cl. .................. 710/105; 710/60; 710/305
(58) Field of Classification Search .............. 710/8, 710/10, 60, 104, 305, 14, 110, 105–106
See application file for complete search history.

(56) References Cited

U.S. PATENT DOCUMENTS

| | | | |
|---|---|---|---|
| 5,938,731 A * | 8/1999 | Schreiter | 709/227 |
| 6,141,354 A * | 10/2000 | Nakatsugawa | 370/465 |
| 6,539,443 B1 * | 3/2003 | Dunstan et al. | 710/106 |
| 6,564,340 B1 | 5/2003 | Odegard et al. | |
| 6,813,648 B1 * | 11/2004 | Perona et al. | 710/8 |
| 2002/0199051 A1 * | 12/2002 | Fukae et al. | 710/106 |
| 2003/0131122 A1 * | 7/2003 | Kondo e tal. | 709/233 |

OTHER PUBLICATIONS

"2sSST Source Synchronous Transfer Draft Standard", VITA 1.5—200x, Draft 2.3, Nov. 6, 2002.*
"VMEH22501 in 2eSST and Conventional VME Backplane Applications", Texas Instruments, Application Report, SCEA028 - Nov. 2002.*

* cited by examiner

Primary Examiner—Rehana Perveen
Assistant Examiner—Trisha Vu
(74) Attorney, Agent, or Firm—Kevin D. Wills

(57) ABSTRACT

In a multi-service platform system (103), a method of transfer speed (119) negotiation includes an initiator VME module (402) communicating a negotiation code (406) to a responder VME module (404) using a two edge source synchronous protocol. If the responder VME module recognizes the negotiation code, the responder VME module communicating to the initiator VME module a negotiation ready signal (408). The initiator VME module and the responder VME module auto-negotiating for a transfer speed (119) and setting a negotiated transfer speed between the initiator VME module and the responder VME module.

42 Claims, 8 Drawing Sheets

700

METHOD OF VME MODULE TRANSFER SPEED AUTO-NEGOTIATION

RELATED APPLICATIONS

Related subject matter is disclosed in U.S. patent application entitled "MONOLITHIC VMEBUS BACKPLANE HAVING VME BRIDGE MODULE" having application Ser. No. 10/836,707 and filed on the same date herewith and assigned to the same assignee.

Related subject matter is disclosed in U.S. patent application entitled "METHOD AND APPARATUS OF REGENERATING DATA SIGNAL IN MONOLITHIC VMEBUS BACKPLANE" having application Ser. No. 10/836,708 and filed on the same date herewith and assigned to the same assignee.

BACKGROUND OF THE INVENTION

In current high-speed data networks, such as multi-service platform systems using VERSAmodule Eurocard (VMEbus) protocols, maximum transfer speeds are limited by the number of slots occupied by payload nodes, the distance between payload nodes, signal degradation on the parallel bus, and the like. Due to the myriad of factors affecting signal integrity on the parallel bus, it is difficult to optimize transfer speed between payload nodes for a given configuration. For example, the more slots on a backplane that are occupied by payload nodes, the more likely there will be noise and other types of signal integrity interference introduced on the parallel bus.

Accordingly, there is a significant need for an apparatus and method that overcomes the deficiencies of the prior art outlined above.

BRIEF DESCRIPTION OF THE DRAWINGS

Referring to the drawing.

Figure 1:
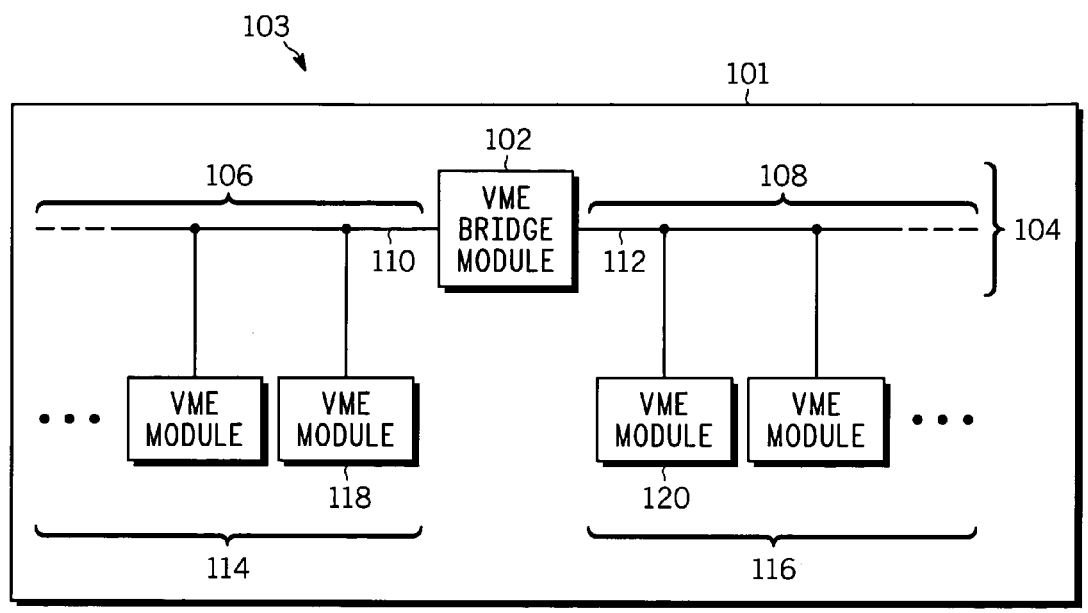
FIG. 1 depicts a computer system according to one embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

FIG. 1 depicts a computer system 100 according to one embodiment of the invention. Computer system 100 can include a single VME chassis 101, with software and any number of slots for inserting VME modules. In an embodiment, computer system 100 can include a computer chassis 101 having 21 slots. Computer systems with other than 21 slots are within the scope of the invention. In an embodiment, computer system 100 can be a multi-service platform system 103 that includes a plurality of VME modules. Plurality of modules can add functionality to multi-service platform system 103 through the addition of processors, memory, storage devices, and the like. In one embodiment, multi-service platform system 103 includes a single chassis 101 having a monolithic VMEbus backplane 104 that can include a backplane connector for connecting each of the plurality of VME modules placed in the slots. Monolithic VMEbus backplane 104 includes a single backplane in a single VME chassis 01 designed for communicating via VMEbus protocols to VMEbus modules coupled to monolithic VMEbus backplane 104. As an example of an embodiment, a multi-service platform system 103 can include model MVME5100 manufactured by Motorola Computer Group, 2900 South Diablo Way, Tempe, Ariz. 85282. The invention is not limited to this model or manufacturer and any multi-service platform system is included within the scope of the invention.

Computer system 100 can include any number of VME modules coupled to monolithic VMEbus backplane 104. Monolithic VMEbus backplane 104 can include hardware and software necessary to implement a data network using parallel multi-drop protocols. An example of a parallel multi-drop topology is a VERSAmodule Eurocard (VMEbus) system using any of the VMEbus protocols known in the art.

A parallel multi-drop protocol, can be for example, a Peripheral Component Interconnect (PCI) based protocol. In an embodiment of the invention, PCI based protocols can include both PCI and PCI-X protocols. Examples of variants of PCI protocols, without limitation, include 133 MHz 64-bit PCI-X, 100 MHz 64-bit PCI-X down to 66 MHz 32-bit PCI-X, and the like. Variants of older PCI based protocols can include, for example and without limitation, 66 MHz 64-bit PCI down to 33 MHz 32-bit PCI, and the like.

In another embodiment of the invention, VMEbus based protocols can include, but are not limited to, Single Cycle Transfer protocol (SCT), Block Transfer protocol (BLT), Multiplexed Block Transfer protocol (MBLT), Two Edge VMEbus protocol (2eVME) and Two Edge Source Synchronous Transfer protocol (2eSST). These VMEbus protocols are known in the art.

Multi-service platform system 103 can be controlled by a platform controller (not shown for clarity), which can include a processor for processing algorithms stored in memory. Memory comprises control algorithms, and can include, but is not limited to, random access memory (RAM), read only memory (ROM), flash memory, electrically erasable programmable ROM (EEPROM), and the like. Memory can contain stored instructions, tables, data, and the like, to be utilized by processor. Platform controller can be contained in one, or distributed among two or more VME modules with communication among the various modules of multi-service platform system 103 occurring via monolithic VMEbus backplane 104. Platform controller also controls the functionality of multi-service platform system 103 including managing any VME modules placed in the slots of the chassis 101 to add functionality to the multi-service platform system 103.

In an embodiment, monolithic VMEbus backplane 104 includes a VME bridge module 102 which is integrally embedded in VMEbus backplane 104. VME bridge module 102 is an integral part of VMEbus backplane and not part of a VME module coupled to the monolithic VMEbus backplane 104. VME bridge module 102 is embedded in monolithic VMEbus backplane 104 in that VME bridge module 102 cannot be removed or serviced by a user of VME chassis 101 and that substantially all communication traces in the backplane pass through VME bridge module 102. This is as opposed to prior art bridge modules mounted on VME modules, where the prior art bridge modules merely plug into the backplane.

In an embodiment, VME bridge module 102 can segment monolithic VMEbus backplane 104 into a plurality of VME backplane segments. In the embodiment shown in FIG. 1, VME bridge module 102 segments monolithic VMEbus backplane 104 into first VME backplane segment 106 and second VME backplane segment 108. In another embodiment, multiple VME bridge modules can segment monolithic VMEbus backplane 104 into any number of a plurality of VME backplane segments.

In the embodiment shown in FIG. 1, each VME backplane segment comprises a VME backplane bus. For example, first VME backplane segment 106 comprises first VME backplane bus 110, and second VME backplane segment 108 comprises second VME backplane bus 112. In another embodiment, multiple VME bridge modules can segment monolithic VMEbus backplane 104 into any number of VME backplane buses.

In an embodiment, first set of VME modules 114 is coupled to first VME backplane segment 106 and second set of VME modules 116 is coupled to second VME backplane segment 108. Each of first set of VME modules 114 and second set of VME modules 116 can add functionality to multi-service platform system 103 through the addition of processors, memory, storage devices, and the like. In an embodiment, first VME backplane segment 106 can comprise first VME module 118, and second VME backplane segment 108 can comprise second VME module 120. First VME module 118 is coupled to communicate with other VME modules in first set of VME modules 114 over first VME backplane bus 110. Second VME module 120 is coupled to communicate with other VME modules in second set of VME modules 116 over second VME backplane bus 112. VME bridge module 102 couples first VME backplane bus 110 and second VME backplane bus 112.

Figure 2:
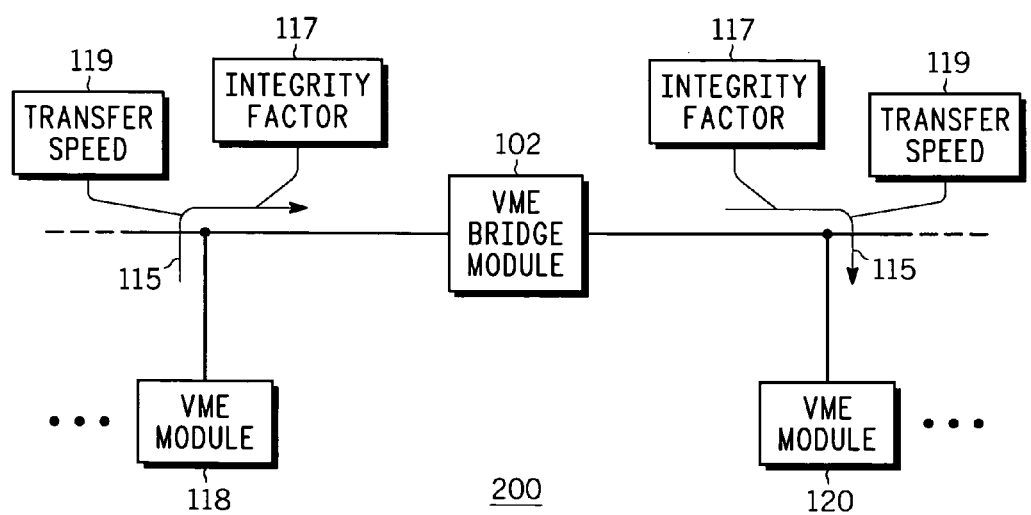
FIG. 2 depicts a computer system according to another embodiment of the invention.

FIG. 2 depicts a computer system 200 according to another embodiment of the invention. As shown in FIG. 2, a data signal 115 communicated from one of the plurality of VME backplane segments to another one of the plurality of VME backplane segments by VME bridge module 102 is regenerated by VME bridge module 102. In another embodiment, data signal 115 generated by first VME module is copied to second VME module 120 by VME bridge module 102. In an embodiment, data signal 115 is placed on first VME backplane bus 110 by first VME module 118. Data signal 115 is then regenerated and copied by VME bridge module 102 onto second VME backplane bus 112 for second VME module 120. In effect, VME bridge module 102 copies data signal 115 from first VME backplane segment 106 to second VME backplane segment 108.

In an embodiment, all data signals 115 generated by any of first set of VME modules 114 are read from first VME backplane bus 110, regenerated and then copied to second VME backplane bus 112 by VME bridge module 102. Also, in an embodiment, all data signals 115 generated by any of second set of VME modules 116 are read from second VME backplane bus 112, regenerated and then copied to first VME backplane bus 110 by VME bridge module 102.

In an embodiment, regenerating data signal 115 can include increasing an integrity factor 117 of data signal 115. As an example, increasing integrity factor 117 of data signal 115 can include receiving data signal 115 from first VME backplane bus 110, where data signal 115 is truncated or otherwise distorted in either time or amplitude. For example, data signal 115 can be a square wave, where the square wave is truncated or distorted in either time or amplitude. Data signal 115 is not limited to square waves and other types of signals are within the scope of the invention.

In prior art multi-service platform systems, the more VME modules used, the more distorted the data signal becomes due to signal noise, and the like, generated by additional VME modules. This has the disadvantageous effect of limiting the transfer speed between VME modules on the same backplane. For example, transfer speeds in the prior art might be limited to 20 Megahertz (MHz) or less because transfer speeds above this creates distortion such that errors are generated in the data signal. Increasing the transfer speed in these prior art multi-service platform systems further distorts the data signal and generates errors in data transmission. In the present embodiment, regenerating data signal 115 allows the transfer speed 119 between any of the plurality of VME modules to increase. In effect, since VME bridge module 102 segments monolithic VMEbus backplane 104 into a plurality of VME backplane segments and VME bridge module 102 regenerates data signal 115 between segments, transfer speed is increased for data signal 115 between any of plurality of VME modules.

In an example of an embodiment, if first VME module 118 generates data signal 115 addressed to one of first set of VME modules 114, data signal 115 has limited distortion because there are fewer VME modules in first set of VME modules 114 than in overall multi-service platform system 103. Therefore, transfer speed 119 of data signal can be increased over that available without VME bridge module 102.

In another example of an embodiment, if first VME module 118 generates data signal 115 addressed to one of second set of VME modules 116, for example second VME module 120, data signal 115 is regenerated and copied by VME bridge module 102. Therefore, transfer speed 119 can be increased for data signal 115 between first VME module 118 and second VME module 120.

Figure 3:
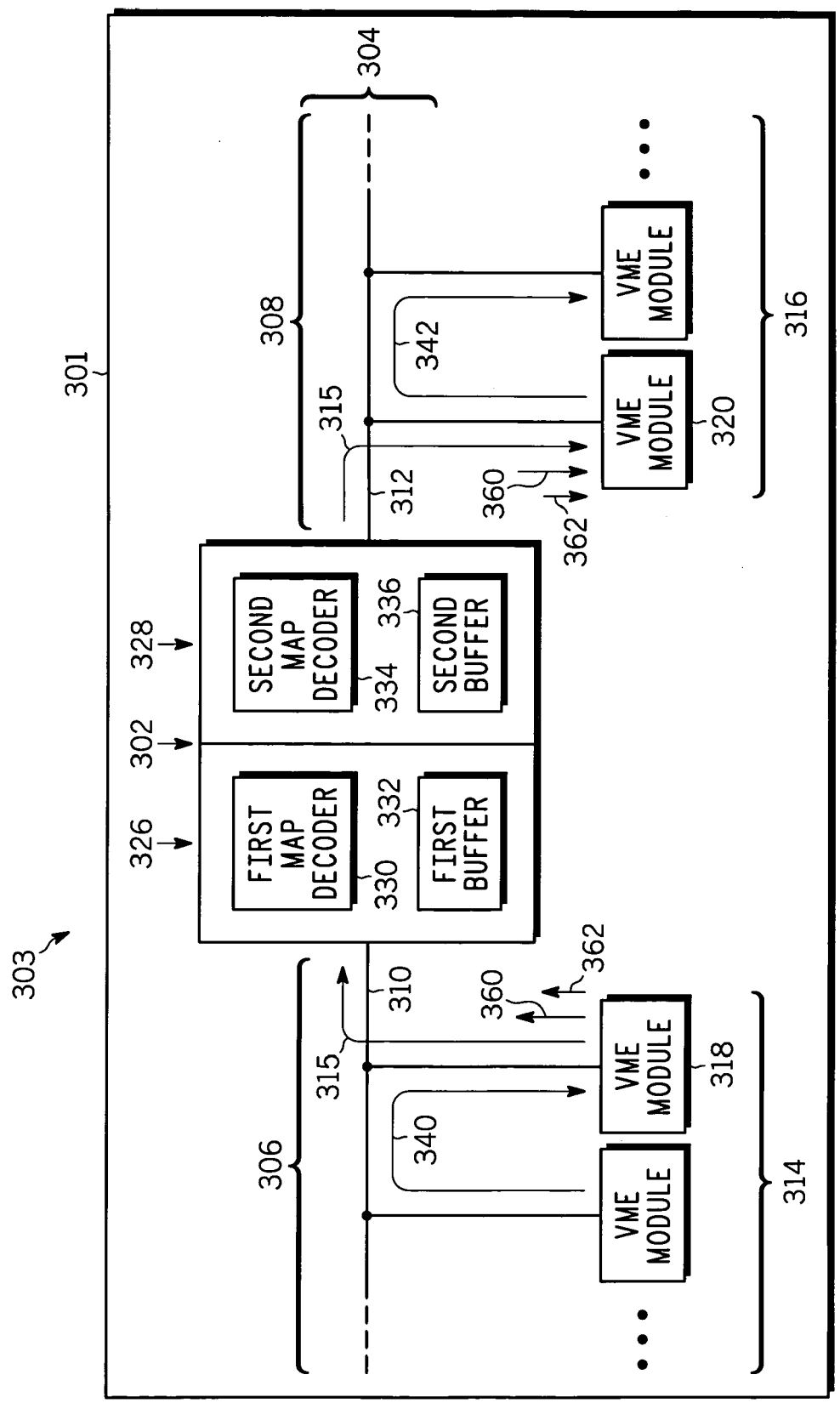
FIG. 3 depicts a computer system according to yet another embodiment of the invention.

FIG. 3 depicts a computer system 300 according to yet another embodiment of the invention. Computer system 300 can include a single VME chassis 301, with software and any number of slots for inserting VME modules. In an embodiment, computer system 300 can be a multi-service platform system 303 that includes a plurality of VME modules. In one embodiment, multi-service platform system 303 includes a single VME chassis 301 having a monolithic VMEbus backplane 304 that can include a backplane connector for connecting each of the plurality of VME modules placed in the slots. Monolithic VMEbus backplane 304 includes a single backplane in a single VME chassis 301 designed for communicating via VMEbus protocols to VMEbus modules coupled to monolithic VMEbus backplane 304. Computer system 300 can include any number of VME modules coupled to monolithic VMEbus backplane 304.

In an embodiment, monolithic VMEbus backplane 304 includes a VME bridge module 302 which is integrally embedded in VMEbus backplane 304. VME bridge module 302 is an integral part of monolithic VMEbus backplane 304 and not part of a VME module coupled to the monolithic VMEbus backplane 304. VME bridge module 302 is embedded in monolithic VMEbus backplane 304 in that VME bridge module 302 cannot be removed or serviced by a user of VME chassis 301 and that substantially all communication traces in the backplane pass through VME bridge module 302.

In an embodiment, VME bridge module 302 can segment monolithic VMEbus backplane 304 into a plurality of VME backplane segments. In the embodiment shown in FIG. 3, VME bridge module 302 segments monolithic VMEbus backplane 304 into first VME backplane segment 306 and second VME backplane segment 308. In another embodiment, multiple VME bridge modules can segment monolithic VMEbus backplane 304 into any number of a plurality of VME backplane segments.

In the embodiment shown in FIG. 3, each VME backplane segment comprises a VME backplane bus. For example, first VME backplane segment 306 comprises first VME backplane bus 310, and second VME backplane segment 308 comprises second VME backplane bus 312. In another embodiment, multiple VME bridge modules can segment monolithic VMEbus backplane 304 into any number of VME backplane buses.

In an embodiment, first set of VME modules 314 is coupled to first VME backplane segment 306 and second set of VME modules 316 is coupled to second VME backplane segment 308. In an embodiment, first VME backplane segment 306 can comprise first VME module 318, and second VME backplane segment 308 can comprise second VME module 320. First VME module 318 is coupled to communicate with other VME modules in first set of VME modules 314 over first VME backplane bus 310. Second VME module 320 is coupled to communicate with other VME modules in second set of VME modules 316 over second VME backplane bus 312. VME bridge module 302 couples first VME backplane bus 310 and second VME backplane bus 312.

In an embodiment, VME bridge module 302 comprises first module portion 326 coupled to first VME backplane segment 306 and first VME backplane bus 310. VME bridge module 302 also comprises second module portion 328 coupled to second VME backplane segment 308 and second VME backplane bus 312. First module portion 326 comprises first map decoder 330 and first buffer 332. Second module portion 328 comprises second map decoder 334 and second buffer 336. In an embodiment, first module portion 326 appears on first VME backplane bus 310 as another of first set of VME modules 314. Also, second module portion 328 appears on second VME backplane bus 312 as another one of second set of VME modules 316.

In an embodiment, although VME bridge module 302 comprises first module portion 326 and second module portion 328, VME bridge module 302 can be monolithic and on a single chip. First module portion 326 and second module portion 328 are coupled by, for example and without limitation, multiplexers, switches, gates, and the like. Since first module portion 326 and second module portion 328 can be a monolithic, single chip, there is no need for a bus interconnection. However, the presence of an bus connection can be included in an embodiment of the invention.

In the embodiment depicted in FIG. 3, VME bridge module 302 can act as a router and selectively forward data generated by any of first set of VME modules 314 addressed to any of second set of VME modules 316. Also, VME bridge module 302 can prevent data signals generated by any of first set of VME modules 314 and addressed to any other of first set of VME modules 314 from being communicated to second VME backplane bus 312.

In another embodiment, VME bridge module 302 can act as a router and selectively forward data generated by any of second set of VME modules 316 addressed to any of first set of VME modules 314. Also, VME bridge module 302 can prevent data signals generated by any of second set of VME modules 316 and addressed to any other of second set of VME modules 316 from being communicated to first VME backplane bus 310.

In an example of an embodiment, first VME module 318 generates data signal 315 addressed to second VME module 320. VME bridge module 302 selectively routes data signal 315 to second VME module 320. In other words, first VME module 318 generates data signal 315 and places it on first VME backplane bus 310. First module portion 326 detects data signal 315 and determines it is addressed to one of second set of VME modules 316, specifically second VME module 320. First module portion 326 then communicates data signal 315 to second module portion 328, which places data signal 315 on second VME backplane bus 312 for second VME module 320 to receive.

In another example of an embodiment, first data signal 340 is generated by one of first set of VME modules 314 and addressed to another one of first set of VME modules 314. Also, second data signal 342 is generated by one of second set of VME modules 316 and addressed to another one of second set of VME modules 316. Since VME bridge module 302 acts as a router and segments monolithic VMEbus backplane 304 into first VME backplane segment 306 and second VME backplane segment 308, first data signal 340 operates independently and simultaneously on monolithic VMEbus backplane 304 as second data signal 342. In other words, first data signal 340 is generated and addressed solely within the domain of first set of VME modules 314, and second data signal 342 is generated and addressed solely within the domain of second set of VME modules 316. Since first set of VME modules 314 is coupled to first VME backplane segment 306 and second set of VME modules is coupled to second VME backplane segment 308, both first data signal 340 and second data signal 342 are able to operate simultaneously and independently on monolithic VMEbus backplane 304. In effect, first data signal 340 is exclusively communicated over first VME backplane bus 310 and second data signal 342 is exclusively communicated over second VME backplane bus 312.

In an embodiment, first map decoder 330 is coupled to route data signals generated by any of first set of VME modules 314 and addressed to any of second set of VME modules 316. Also, second map decoder 334 is coupled to route data signals generated by any of second set of VME modules 316 and addressed to any of first set of VME modules 314. First map decoder 330 comprises addresses for VME modules coupled to second VME backplane segment 308. Second map decoder 334 comprises addresses for VME modules coupled to first VME backplane segment 306.

In effect, first map decoder 330 is coupled to route data from first VME backplane segment 306 to second VME backplane segment 308 only when data is generated by a VME module coupled to first VME backplane segment 306 and addressed to a VME module coupled to second backplane segment 308. Also, second map decoder 334 is coupled to route data from second VME backplane segment 308 to first VME backplane segment 306 only when data is generated by a VME module coupled to second VME backplane segment 308 and addressed to a VME module coupled to first VME backplane segment 306.

In an embodiment, first buffer 332 queues data addressed to second VME backplane segment 308, and second buffer 336 queues data addressed to first VME backplane segment 306. As an example of an embodiment, first VME module 318 can write data to second VME module 320, where first buffer 332 queues data addressed to second VME module 320. As another example of an embodiment, second VME module 320 can write data to first VME module 318, where second buffer 336 queues data addressed to first VME module 318.

In an example of an embodiment, first VME module 318 in first backplane segment 306 wishes to write data to second VME module 320 in second VME backplane segment 308. This can be done by first VME module 318 generating a write data signal 362 addressed to second VME module 320. First VME module 318 arbitrates for control of first VME backplane bus 310 and gains control of first VME backplane bus 310. First VME module 318 writes data to first VME backplane bus 310, where the data is addressed to second VME module 320 coupled to second VME backplane bus 312. First module portion 326 of VME bridge module 302 determines data is addressed to second VME module 320 on second VME backplane bus 312. First map decoder 330 of first module portion 326 can determine this because first map decoder 330 contains addresses for all VME modules in second set of VME modules 316. First module portion 326 then buffers data in first buffer 332. Second module portion 328 of VME bridge module 302 then arbitrates for control of second VME backplane bus 312 and gains control of second VME backplane bus 312. Second module portion 328 then begins writing the data that was buffered onto second VME backplane bus 312. If the amount of data exceeds buffer capacity, then standard VME flow control mechanisms can prioritize data traffic. Thereafter, the data is written to second VME module 320. In an embodiment, this process can be repeated for other VME bridge modules and other VME backplane segments if monolithic VMEbus backplane 104 includes more than one VME bridge module 302, and consequently more than two VME backplane segments.

In another example of an embodiment, first VME module 318 in first backplane segment 306 wishes to read data from second VME module 320 in second backplane segment 308. This can be done by first VME module 318 generating a read request signal 360 addressed to second VME module 320. First VME module 318 arbitrates for control of first VME backplane bus 310 and gains control of first VME backplane bus 310. First VME module 318 then initiates read request signal 360 on first VME backplane bus 310, where read request signal 360 is addressed to second VME module 320. First module portion 326 of VME bridge module 302 recognizes that read request signal 360 is addressed to second VME module 320 on second VME backplane bus 312. First map decoder 330 of first module portion 326 can determine this because first map decoder 330 contains addresses for all VME modules in second set of VME modules 316. Second module portion 328 of VME bridge module 302 then arbitrates for control of second VME backplane bus 312 and gains control of second VME backplane bus 312. In this embodiment, no buffering of the read request signal 360 is required. Second module portion 328 then initiates read request signal 360 on second VME backplane bus 312. Thereafter, second VME module 320 can accept read request signal 360 and begin writing requested data onto second VME backplane bus 312. In an embodiment, first VME backplane bus 310 is suspended waiting for requested data to be received from second VME module 320 through VME bridge module 302. Buffering of requested data by VME bridge module 302 can be optional.

Figure 4:
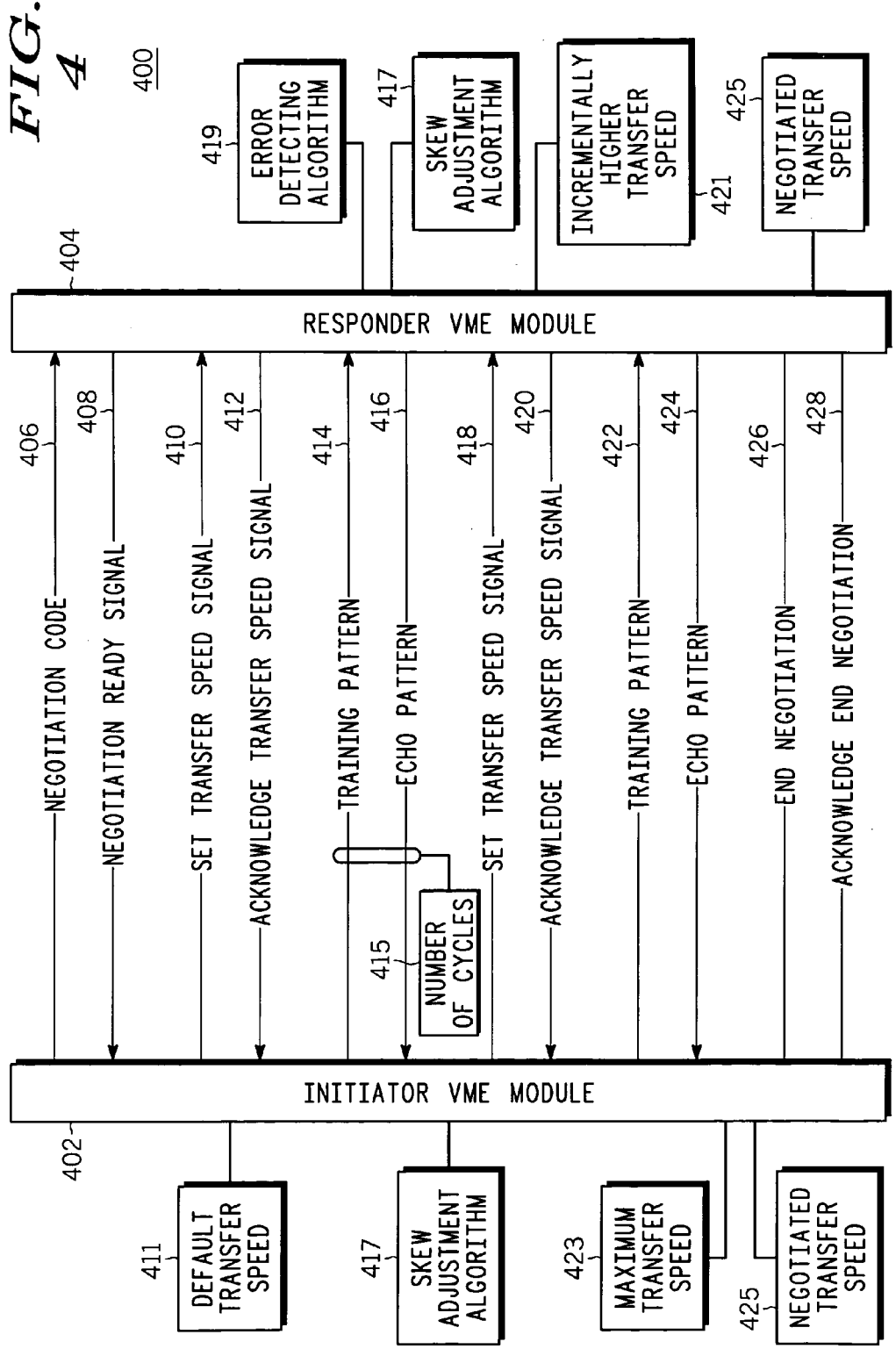
FIG. 4 depicts a ladder diagram illustrating an embodiment of the invention.

FIG. 4 depicts a ladder diagram 400 illustrating an embodiment of the invention. In an example of an embodiment depicted in FIG. 4, initiator VME module 402 auto-negotiates with responder VME module 404 using Two Edge Source Synchronous Transfer protocol (2eSST), wherein 2eSST is known in the art of multi-service platform systems employing VMEbus protocols.

VMEbus transfers have two phases, an address phase and a data phase. In the address phase, the target VME module's address is indicated along with the type of VME protocol to be used. In an embodiment, the VMEbus protocol to be used is 2eSST. Also indicated in the address phase can be the transfer speed (clock speed of the transfer) to be used, for example, 10 MHz, 16.67 MHz, 20 MHz, and the like. When using the 2eSST protocol, the initiator VME module (the module who initiates data transfer) sets the transfer speed. In the prior art, 20 MHz is the maximum clock speed allowed in a chassis due to signal noise and data errors discussed above. The fewer VME modules and/or available slots on the monolithic VMEbus backplane in multi-service platform system 103, the faster the transfer rate can become. In the data phase, up to 2 kilobytes of data is transferred using the protocol indicated in the address phase. Then the address phase is repeated.

In an embodiment, the protocol type to be used for data transfer is indicated using extended address modifier (XAM) code. XAM code in general is known in the art. Numerous codes within XAM are currently not in use in the VMEbus standard. Any of these XAM codes may be selected to initiate auto-negotiation between initiator VME module 402 and responder VME module 404.

Initiator VME module 402 and responder VME module 404 can be VME modules that are both in first set of VME modules 114 or second set of VME modules 116. Also, initiator VME module 402 can be located in first set of VME modules 114 and responder VME module 404 can be located in second set of VME modules 116. Auto-negotiation for transfer speed between initiator VME module 402 and responder VME module 404 can occur in either embodiment where VME bridge module 102 merely copies data signals between VME buses or where VME bridge module 102 selectively routes data signals between first VME backplane bus 110 and second VME backplane bus 112.

In an embodiment, each pair of VME modules within computer system 100 performs auto-negotiation to determine transfer speed 119 between those two respective VME modules. It does not matter which of the two VME modules acts as initiator VME module 402 or responder VME module 404. Once the transfer speed 119 between the two modules is auto-negotiated, the transfer speed can be used for data transfer in both directions between VME modules. In an embodiment, auto-negotiating can occur between each pair of VME modules at initialization of multi-service platform system 103. In another embodiment, auto-negotiation between each pair of VME modules can occur at a configuration change of multi-service platform system 103. In yet another embodiment, auto-negotiation can occur when prompted by a service or application running in computer system 100. Change in configuration can include, but is not limited to a change in the number of VME modules in multi-service platform system 103, change in operating temperature of multi-service platform system 103 or any individual VME module, change in applications running on the system, and the like.

Referring to the ladder diagram in FIG. 4, initiator VME module 402 communicates negotiation code 406 to responder VME module 404. In an embodiment, negotiation code 406 is an XAM code. XAM code used to indicate negotiation can be fixed but otherwise arbitrary. This XAM code is known to both initiator VME module 402 and responder VME module 404. In a preferred embodiment, this XAM code has a default value that is changeable through a register in a chip on VME modules. In another embodiment, XAM code indicating 2eSST protocol and auto-negotiation can be fixed in a standard. In another embodiment, negotiation code 406 indicates use of 2eSST protocol for communication between initiator VME module 402 and responder VME module 404.

If responder VME module 404 recognizes negotiation code 406, responder VME module 404 will return negotiation ready signal 408. In an embodiment, responder VME module 404 returning negotiation ready signal 408 means that responder VME module 404 is capable of communicating using 2eSST protocol and of auto negotiating transfer speed 119. If negotiation ready signal 408 is not returned to initiator VME module 402 within a given time out period, a default transfer speed 411 can be set between initiator VME module 402 and responder VME module 404. Default transfer speed 411 can be any transfer speed normally used in VMEbus, for example, 10 MHz, 20 MHz, and the like. Not returning negotiation ready signal 408 can mean that responder VME module 404 does not recognize and cannot communicate using 2eSST protocol or that responder VME module 404 is not capable of auto-negotiating transfer speed 119.

An optional step in auto-negotiation occurs where initiator VME module 402 sends set transfer speed signal 410 to responder VME module 404, thereby setting the transfer speed 119 between VME modules for a particular iteration. Responder VME module 404 can then respond with acknowledge transfer speed signal 412 to initiator VME module 402 indicating that transfer speed 119 is set for a particular iteration during auto-negotiation.

Once initiator VME module 402 determines that responder VME module 404 will auto-negotiate and is capable of communicating using 2eSST protocol, initiator VME module 402 can send training pattern 414 to responder VME module 404. Training pattern 414 can be a fixed but otherwise arbitrary data pattern chosen by those skilled in the art. Training pattern 414 may be programmed into initiator VME module 402 and responder VME module 404 ahead of time. In an embodiment, training pattern 414 is sent at transfer speed 119 to responder VME module 404. Then responder VME module 404 can detect transfer speed 119 in training pattern 414 and set itself to that transfer speed 119.

Optionally, training pattern 414 can include error detecting algorithm 419 that is executable by responder VME module 404 upon receipt of training pattern 414. Using error detecting algorithm 419, responder VME module 404 can detect a transmission error in training pattern 414. In an embodiment, responder VME module 404 can then change training pattern 414 prior to echoing back to initiator VME module to ensure that no match between training pattern 414 and echo pattern 416.

Once responder VME module 404 receives training pattern 414, responder VME module 404 can communicate echo pattern 416 to initiator VME module 402. Responder VME module 404 attempts to mimic training pattern 414 in generating and communicating echo pattern 416 to initiator VME module 402. In effect, responder VME module 404 communicates echo pattern 416 at transfer speed 119 sent by initiator VME module 402 in training pattern 414. In an embodiment, sending training pattern 414 and echo pattern 416 by initiator VME module 402 and responder VME module 404 respectively, occurs for a number of cycles 415. Number of cycles can be any number of cycles, for example numbering in the thousand or millions. In an embodiment, in each of number of cycles 415, echo pattern 416 should match training pattern 414. Initiator VME module 402 compares echo pattern 416 to training pattern 414 to determine if they correspond. Echo pattern 416 matching training pattern 414 can indicate that responder VME module 404 is capable of communicating with initiator VME module 402 at transfer speed 119 sent out in training pattern 414 by initiator VME module 402 and using the 2eSST protocol.

If echo pattern 416 received by initiator VME module 402 from responder VME module 404 matches training pattern 414 for number of cycle 415, initiator VME module 402 can send training pattern 422 at an incrementally higher transfer speed 421 to responder VME module 404. Optionally, set transfer speed signal 418 and acknowledge transfer speed signal 420 can be sent out as described above to set responder VME module 404 to incrementally higher transfer speed 421. Otherwise, responder VME module 404 can determine incrementally higher transfer speed 421 from training signal 422. Since responder VME module 404 successfully communicated echo pattern 416 at a previous transfer speed, initiator VME module 402 will try sending training pattern at incrementally higher transfer speed 421 and see if echo pattern 424 received from responder VME module 404 successfully corresponds to training pattern 422 for a number of cycles 415. For example, if training pattern 414 and echo pattern 416 successfully correspond at 20 MHz, transfer speed can be increased to 25 MHz. This is only an example and is not limiting of the invention.

In an embodiment, a maximum transfer speed 423 can be set, above which initiator VME module 402 and responder VME module 404 will not be permitted to communicate. For example, maximum transfer speed might be set at 60 MHz.

If, during any of the number of cycles 415, echo pattern 416 received from responder VME module 404 fails to correspond to training pattern 414, it implies that responder VME module 404 cannot communicate at transfer speed 119 sent in training pattern 414 by initiator VME module 402. In this case, initiator VME module 402 de-increments transfer speed 119 to negotiated transfer speed 425 and negotiated transfer speed 425 is the speed at which initiator VME module 402 and responder VME module 404 will communicate.

In effect, sending training pattern at a transfer speed, setting to transfer speed and sending training pattern at incrementally higher transfer speed occur until either maximum transfer speed 423 is reached or echo pattern fails to correspond to training pattern. If incrementally higher transfer speed 421 equals maximum transfer speed 423, and training pattern and echo pattern successfully correspond for number of cycles 115, negotiated transfer speed 425 can be set at maximum transfer speed 423. If echo pattern does not correspond to training pattern for number of cycles at a transfer speed, initiator VME module 402 de-increments transfer speed to negotiated transfer speed 425. For example, if training pattern and echo pattern did not successfully correspond for number of cycles 415 at 30 MHz, initiator VME module 402 can de-increment transfer speed to the last successful transfer speed where training pattern and echo pattern corresponded, for example 25 MHz. In another embodiment, initiator VME module 402 can de-increment to a transfer speed above the last successful transfer speed, and thereby iterate toward the highest possible transfer speed available.

Negotiated transfer speed 425 is the speed at which initiator VME module 402 and responder VME module 404 will communicate using 2eSST protocol until re-negotiation occurs as described above. Once negotiated transfer speed 425 is set, initiator VME module 402 can send end negotiation signal 426 to responder VME module 404 indicating that negotiated transfer speed 425 has been determined and that auto-negotiation is concluded. Responder VME module 404 can return acknowledge end negotiation signal 428 to initiator VME module 402.

Optionally, either or both the initiator VME module 402 and the responder VME module 404 can include skew adjustment algorithm 417, where skew in training pattern or echo pattern is corrected. Methods of performing skew adjustment on a signal are known in the art.

Figure 5:
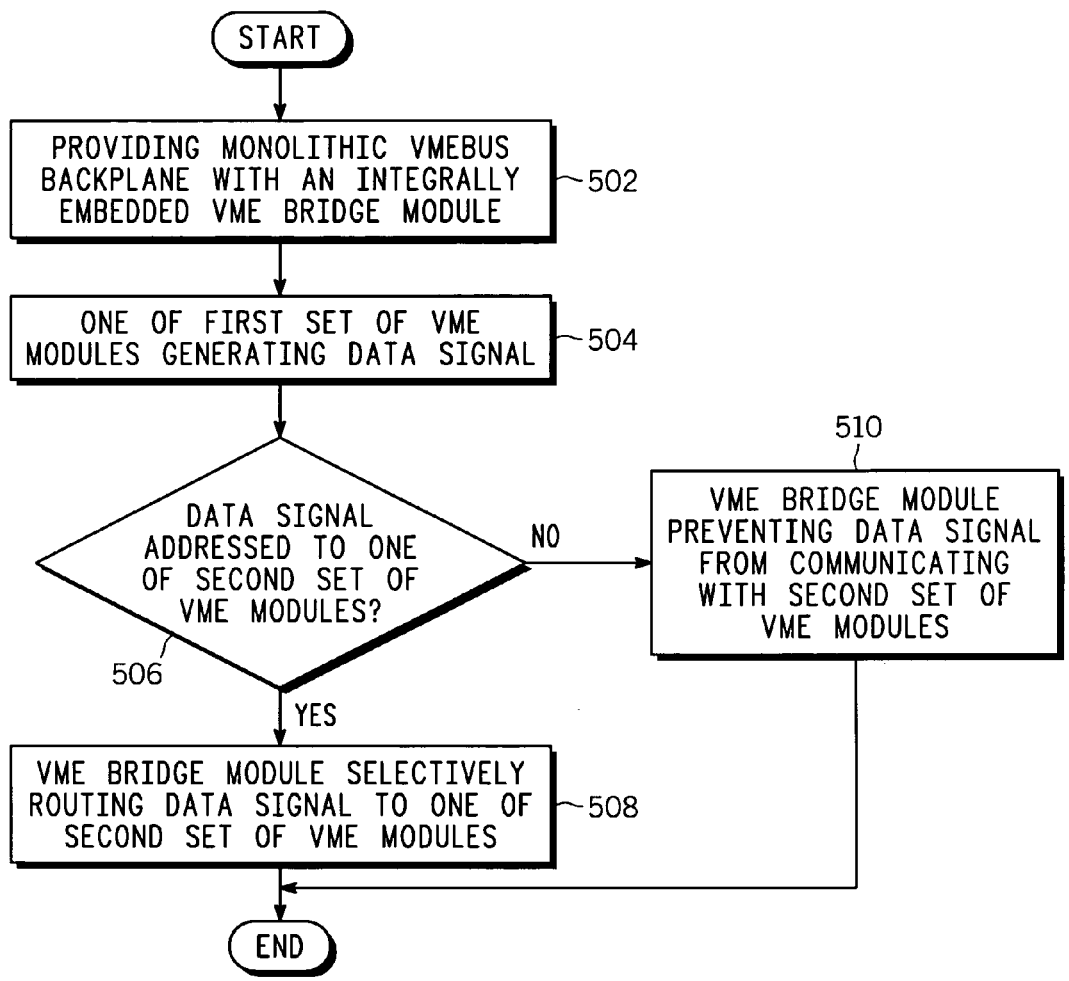
FIG. 5 illustrates a flow diagram of a method of the invention according to an embodiment of the invention.

FIG. 5 illustrates a flow diagram 500 of a method of the invention according to an embodiment of the invention. In step 502, a monolithic VMEbus backplane with an integrally embedded VME bridge module is provided. In step 504, one of a first set of VME modules generates a data signal. In step 506 it is determined if data signal is addressed to one of second set of VME modules. If so, VME bridge module selectively routes data signal to one of second set of VME modules. If not, VME bridge module prevents data signal from communicating with second set of VME modules.

Figure 6:
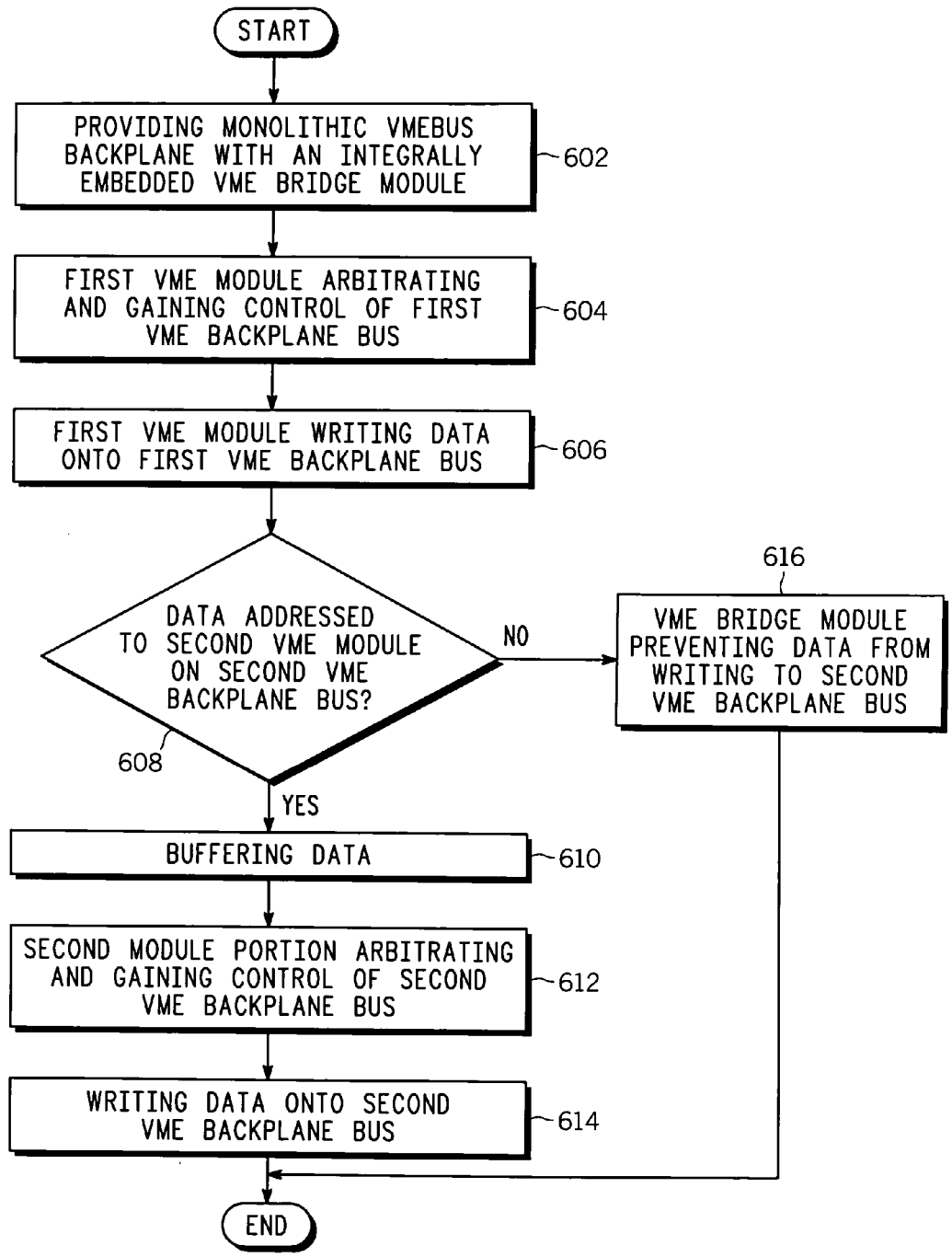
FIG. 6 illustrates a flow diagram of a method of the invention according to another embodiment of the invention.

FIG. 6 illustrates a flow diagram 600 of a method of the invention according to another embodiment of the invention. The embodiment illustrated in FIG. 6, is when first VME module in first backplane segment wishes to write data to another VME module in monolithic VMEbus backplane. In step 602, a monolithic VMEbus backplane with an integrally embedded VME bridge module is provided. In step 604, first VME module arbitrates for control of first VME backplane bus and gains control of first VME backplane bus. In step 606, first VME module writes data to first VME backplane bus.

In step 608 it is determined if data is addressed to VME module on second VME backplane bus. If so, data is buffered in first module portion per step 610. In step 612, second module portion arbitrates and gains control of second VME backplane bus. In step 614, data is written onto second VME backplane bus, and then to second VME module. If data is not addressed to second VME module on second VME backplane bus per step 608, then VME bridge module prevents the write request signal and data from writing to second VME backplane bus per step 616.

Figure 7:
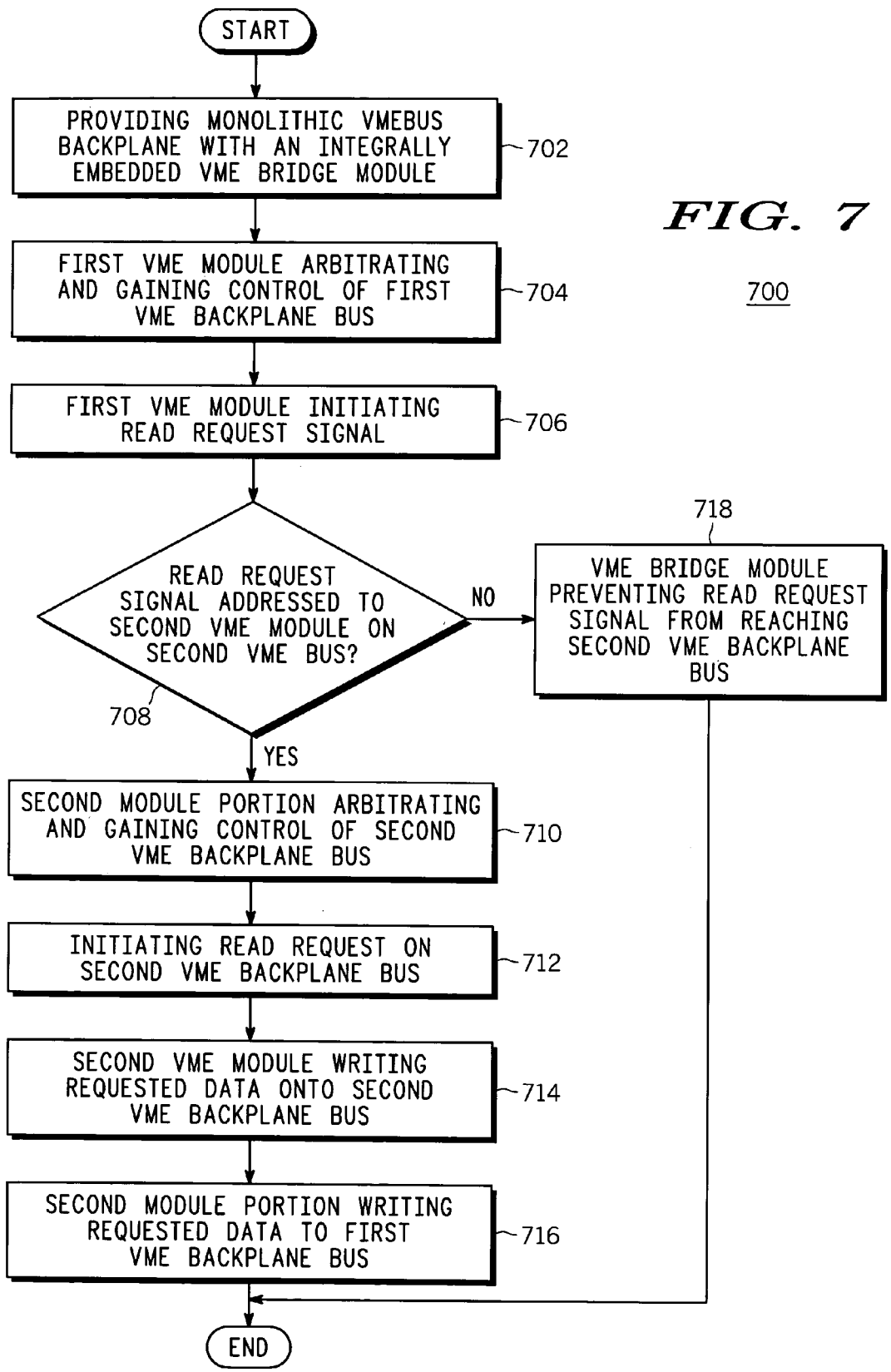
FIG. 7 illustrates a flow diagram of a method of the invention according to yet another embodiment of the invention.

FIG. 7 illustrates a flow diagram 700 of a method of the invention according to yet another embodiment of the invention. The embodiment illustrated in FIG. 7, is when first VME module in first backplane segment wishes to read data from another VME module coupled to monolithic VMEbus backplane. In step 702, a monolithic VMEbus backplane with an integrally embedded VME bridge module is provided. In step 704, first VME module arbitrates for control of first VME backplane bus and gains control of first VME backplane bus. In step 706, first VME module initiates read request signal on first VME backplane bus.

In step 708 it is decided if read request signal is addressed to second VME module on second VME bus. If so, second module portion arbitrates and gains control of second VME backplane bus per step 710. In step 712, read request signal is initiated on second VME backplane bus to second VME module. In step 714, second VME module writes requested data onto second VME backplane bus. In step 716, second module portion writes requested data to first VME backplane bus so that data can reach first VME module that initiated read request signal. If read request signal is not addressed to second VME module on second VME backplane bus per step 708, then VME bridge module prevents read request signal from reaching second VME backplane bus per step 718.

Figure 8:
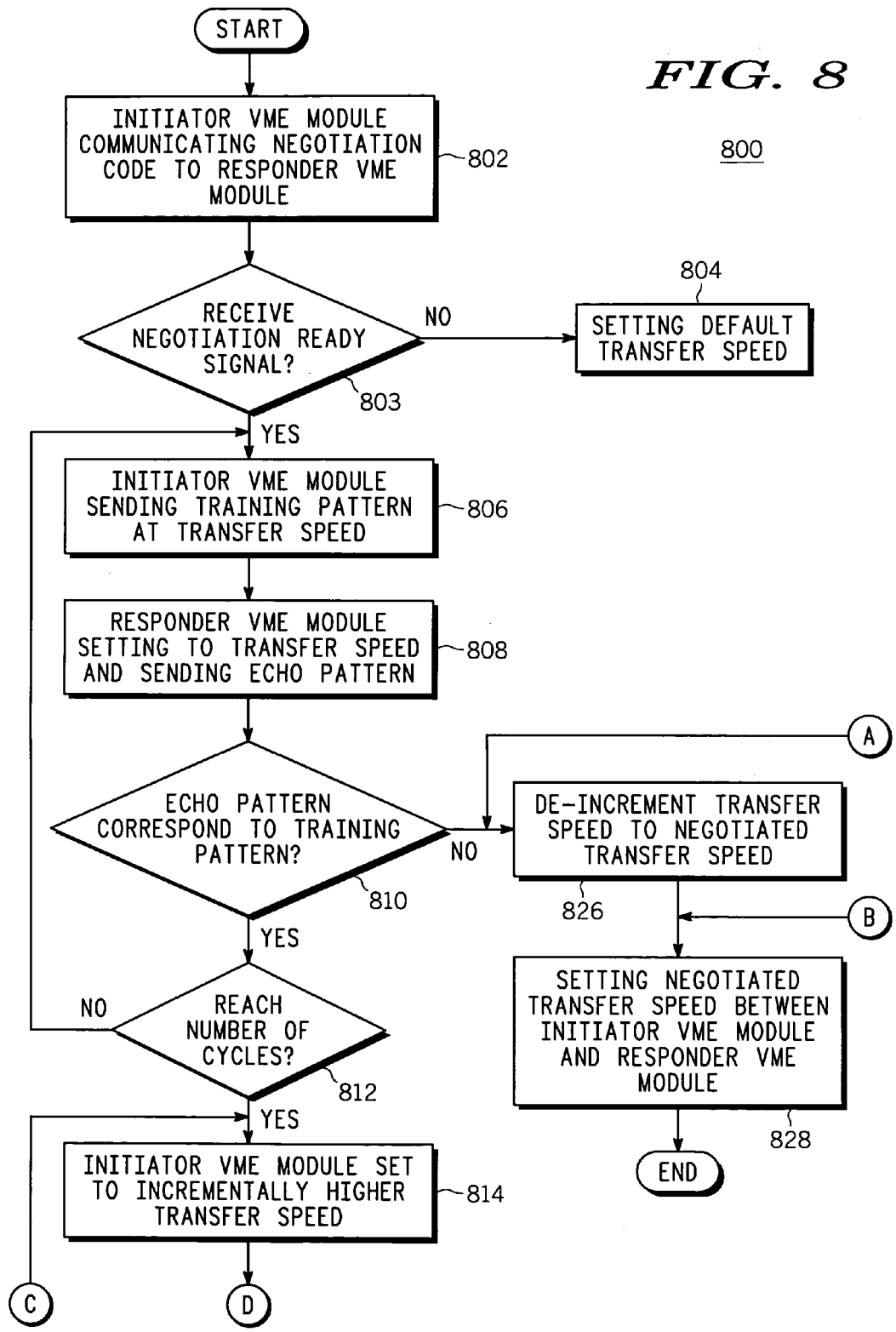
FIGS. 8 and 9 illustrate a flow diagram of a method of the invention according to still another embodiment of the invention.
Figure 9:
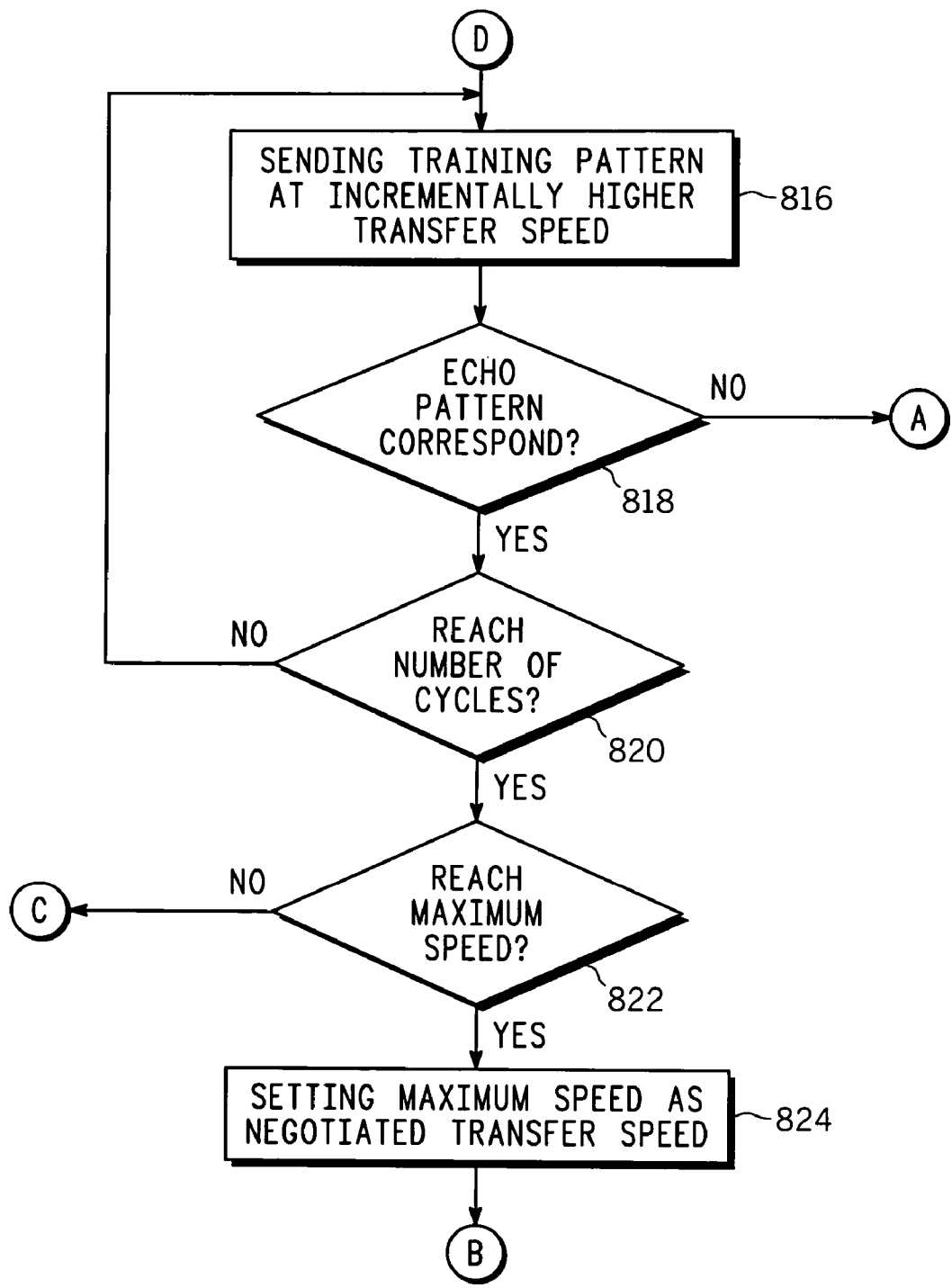

FIGS. 8 and 9 illustrate a flow diagram 800 of a method of the invention according to still another embodiment of the invention. In step 802, an initiator VME module communicates negotiation code to responder VME module. In step 803 it is determined if initiator VME module received negotiation ready signal back from responder VME module. If not, initiator VME module sets default transfer speed between initiator VME module and responder VME module per step 804.

If initiator VME module receives negotiation ready signal in step 803, initiator VME module sends training pattern at transfer speed to responder VME module per step 806. Optionally, initiator can send set transfer speed signal to responder VME module to set the transfer speed. Otherwise, responder VME module detects transfer speed from training pattern. In step 808 responder VME module sets to transfer speed and communicates echo pattern back to initiator VME module.

In step 810, initiator VME module determines if echo pattern corresponds to training pattern. If not, initiator VME module de-increments transfer speed to negotiated transfer speed per step 826. Further, initiator VME module sets negotiated transfer speed between initiator VME module and responder VME module per step 828.

If echo pattern corresponds to training pattern in step 810, it is determined if echo pattern has matched training pattern for the number of cycles per step 812. If not, steps 806, 808, 810 and 812 are repeated until either echo pattern doesn't correspond to training pattern or the number of cycles is reached. When the number of cycles is reached in step 812, initiator VME module sets to incrementally higher transfer speed per step 814. In step 816, initiator VME module sends training pattern to responder VME module at the incrementally higher transfer speed.

In step 818 it is determined if echo pattern corresponds to training pattern. If not, initiator de-increments transfer speed per step 826. If echo pattern corresponds in step 818, it is determined if echo pattern has corresponded with training pattern for the number of cycles in step 820. If not, then sending training pattern, receiving echo pattern and comparing is repeated until either echo pattern does not correspond to training pattern or the number of cycles is reached in step 820. If number of cycles is reached in step 820, it is determined if the current transfer speed is the maximum transfer speed in step 822. If so, the maximum transfer speed is set as the negotiated transfer speed in step 824 and step 828. If current transfer speed is not the maximum transfer speed in step 822, initiator VME module sets to incrementally higher transfer speed per step 814 and repeats process until either echo pattern fails to correspond to training pattern or maximum transfer speed is reached.

While we have shown and described specific embodiments of the present invention, further modifications and improvements will occur to those skilled in the art. It is therefore, to be understood that appended claims are intended to cover all such modifications and changes as fall within the true spirit and scope of the invention.

The invention claimed is:

1. In a multi-service platform system, a method of transfer speed negotiation comprising:
   an initiator VME module communicating a negotiation code to a responder VME module using a two edge source synchronous protocol;
   if the responder VME module recognizes the negotiation code, the responder VME module communicating to the initiator VME module a negotiation ready signal;
   the initiator VME module sending a training pattern at a transfer speed to the responder VME module;
   the responder VME module setting to the transfer speed;
   if an echo pattern received from the responder VME module corresponds to the training pattern, the initiator VME module sending the training pattern at an incrementally higher transfer speed to the responder VME module;
   if the echo pattern received from the responder VME module fails to correspond to the training pattern, de-incrementing the transfer speed to a negotiated transfer speed; and
   setting the negotiated transfer speed between the initiator VME module and the responder VME module.

2. The method of claim 1, wherein sending the training pattern at the transfer speed, setting to the transfer speed and sending the training pattern at the incrementally higher transfer speed occur until one of a maximum transfer speed is reached and the echo pattern fails to correspond to the training pattern.

3. The method of claim 1, further comprising:
   providing a maximum transfer speed; and
   if the incrementally higher transfer speed equals the maximum transfer speed, then setting the maximum transfer speed as the negotiated transfer speed.

4. The method of claim 1, wherein if the initiator VME module fails to receive the negotiation ready signal, setting a default transfer speed between the initiator VME module and the responder VME module.

5. The method of claim 1, wherein the initiator VME module sending the training pattern and receiving the echo pattern occurs for a number of cycles, and wherein the echo pattern must correspond to the training pattern for each of the number of cycles for the initiator VME module to send the training pattern at the incrementally higher transfer speed.

6. The method of claim 1, wherein the responder VME module setting to the transfer speed comprises:
   the initiator VME module communicating a set transfer speed signal to the responder VME module; and
   the responder VME module communicating an acknowledge transfer speed signal to the initiator VME module.

7. The method of claim 1, wherein the responder VME module setting to the transfer speed comprises the responder VME module detecting the transfer speed in the training pattern.

8. The method of claim 1, further comprising the responder VME module executing a skew adjustment algorithm upon receipt of the training pattern.

9. The method of claim 1, further comprising the initiator VME module executing a skew adjustment algorithm upon receipt of the echo pattern.

10. The method of claim 1, wherein the training pattern comprises an error detecting algorithm, and wherein the responder VME module executes the error detecting algorithm.

11. The method of claim 1, wherein the negotiation code is an extended address modifier code.

12. The method of claim 1, wherein the negotiation code indicates use of the two edge source synchronous protocol.

13. The method of claim 1, wherein communicating the negotiation code occurs at initialization of the multi-service platform system.

14. The method of claim 1, wherein a configuration change in the multi-service platform system causes communicating of the negotiation code.

15. In a multi-service platform system, a method of transfer speed negotiation comprising:
   an initiator VME module communicating a negotiation code to a responder VME module using a two edge source synchronous protocol;
   if the responder VME module recognizes the negotiation code, the responder VME module communicating to the initiator VME module a negotiation ready signal;
   the initiator VME module and the responder VME module auto-negotiating for a transfer speed; and
   setting a negotiated transfer speed between the initiator VME module and the responder VME module, wherein auto-negotiating comprises: the initiator VME module sending a training pattern at a transfer speed to the responder VME module; the responder VME module setting to the transfer speed; if an echo pattern received from the responder VME module corresponds to the training pattern, the initiator VME module sending the training pattern at an incrementally higher transfer speed to the responder VME module; and if the echo pattern received from the responder VME module fails to correspond to the training pattern, de-incrementing the transfer speed to the negotiated transfer speed.

16. The method of claim 15, wherein sending the training pattern at the transfer speed, setting to the transfer speed and sending the training pattern at the incrementally higher transfer speed occur until one of a maximum transfer speed is reached and the echo pattern fails to correspond to the training pattern.

17. The method of claim 15, further comprising:
providing a maximum transfer speed; and
if the incrementally higher transfer speed equals the maximum transfer speed, then setting the maximum transfer speed as the negotiated transfer speed.

18. The method of claim 15, wherein the initiator VME module sending the training pattern and receiving the echo pattern occurs for a number of cycles, and wherein the echo pattern must correspond to the training pattern for each of the number of cycles for the initiator VME module to send the training pattern at the incrementally higher transfer speed.

19. The method of claim 15, wherein the responder VME module setting to the transfer speed comprises:
the initiator VME module communicating a set transfer speed signal to the responder VME module; and
the responder VME module communicating an acknowledge transfer speed signal to the initiator VME module.

20. The method of claim 15, wherein the responder VME module setting to the transfer speed comprises the responder VME module detecting the transfer speed in the training pattern.

21. The method of claim 15, wherein if the initiator VME module fails to receive the negotiation ready signal, setting a default transfer speed between the initiator VME module and the responder VME module.

22. The method of claim 15, wherein the negotiation code is an extended address modifier code.

23. In an initiator VME module, a method of transfer speed negotiation, comprising:
communicating a negotiation code to a responder VME module using a two edge source synchronous protocol;
if a negotiation ready signal is received from the VME responder module, sending a training pattern at a transfer speed to the responder VME module;
if an echo pattern received from the responder VME module corresponds to the training pattern, sending the training pattern at an incrementally higher transfer speed to the responder VME module;
if the echo pattern received from the responder VME module fails to correspond to the training pattern, de-incrementing the transfer speed to a negotiated transfer speed; and
setting the negotiated transfer speed between the initiator VME module and the responder VME module.

24. The initiator VME module of claim 23, wherein sending the training pattern at the transfer speed and sending the training pattern at the incrementally higher transfer speed occur until one of a maximum transfer speed is reached and the echo pattern fails to correspond to the training pattern.

25. The initiator VME module of claim 23, further comprising:
providing a maximum transfer speed; and
if the incrementally higher transfer speed equals the maximum transfer speed, then setting the maximum transfer speed as the negotiated transfer speed.

26. The initiator VME module of claim 23, wherein if the initiator VME module fails to receive the negotiation ready signal, setting a default transfer speed between the initiator VME module and the responder VME module.

27. The initiator VME module of claim 23, wherein the initiator VME module sending the training pattern and receiving the echo pattern occurs for a number of cycles, and wherein the echo pattern must correspond to the training pattern for each of the number of cycles for the initiator VME module to send the training pattern at the incrementally higher transfer speed.

28. The initiator VME module of claim 23, further comprising the initiator VME module executing a skew adjustment algorithm upon receipt of the echo pattern.

29. In an initiator VME module, a method of transfer speed negotiation, comprising:
communicating a negotiation code to a responder VME module using a two edge source synchronous protocol;
if a negotiation ready signal is received from the VME responder module, the initiator VME module auto-negotiating with the responder VME module for a transfer speed; and
setting a negotiated transfer speed between the initiator VME module and the responder VME module, wherein auto-negotiating comprises: the initiator VME module sending a training pattern at a transfer speed to the responder VME module; if an echo pattern received from the responder VME module corresponds to the training pattern, the initiator VME module sending the training pattern at an incrementally higher transfer speed to the responder VME module; and if the echo pattern received from the responder VME module fails to correspond to the training pattern, de-incrementing the transfer speed to a negotiated transfer speed.

30. The initiator VME module of claim 29, wherein sending the training pattern at the transfer speed and sending the training pattern at the incrementally higher transfer speed occur until one of a maximum transfer speed is reached and the echo pattern fails to correspond to the training pattern.

31. The initiator VME module of claim 29, further comprising:
providing a maximum transfer speed; and
if the incrementally higher transfer speed equals the maximum transfer speed, then setting the maximum transfer speed as the negotiated transfer speed.

32. The initiator VME module of claim 29, wherein the initiator VME module sending the training pattern and receiving the echo pattern occurs for a number of cycles, and wherein the echo pattern must correspond to the training pattern for each of the number of cycles for the initiator VME module to send the training pattern at the incrementally higher transfer speed.

33. A computer-readable medium containing computer instructions for instructing a processor to perform a method of in a multi-service platform system, a method of transfer speed negotiation, the instructions comprising:
an initiator VME module communicating a negotiation code to a responder VME module using a two edge source synchronous protocol;
if the responder VME module recognizes the negotiation code, the responder VME module communicating to the initiator VME module a negotiation ready signal;
the initiator VME module sending a training pattern at a transfer speed to the responder VME module;
the responder VME module setting to the transfer speed;
if an echo pattern received from the responder VME module corresponds to the training pattern, the initiator VME module sending the training pattern at an incrementally higher transfer speed to the responder VME module;
if the echo pattern received from the responder VME module fails to correspond to the training pattern, de-incrementing the transfer speed to a negotiated transfer speed; and setting the negotiated transfer speed between the initiator VME module and the responder VME module.

34. The computer-readable medium of claim 33, wherein sending the training pattern at the transfer speed, setting to the transfer speed and sending the training pattern at the incrementally higher transfer speed occur until one of a maximum transfer speed is reached and the echo pattern fails to correspond to the training pattern.

35. The computer-readable medium of claim 33, further comprising:
providing a maximum transfer speed; and
if the incrementally higher transfer speed equals the maximum transfer speed, then setting the maximum transfer speed as the negotiated transfer speed.

36. The computer-readable medium of claim 33, wherein if the initiator VME module fails to receive the negotiation ready signal, setting a default transfer speed between the initiator VME module and the responder VME module.

37. The computer-readable medium of claim 33, wherein the initiator VME module sending the training pattern and receiving the echo pattern occurs for a number of cycles, and wherein the echo pattern must correspond to the training pattern for each of the number of cycles for the initiator VME module to send the training pattern at the incrementally higher transfer speed.

38. The computer-readable medium of claim 33, wherein the responder VME module setting to the transfer speed comprises:
the initiator VME module communicating a set transfer speed signal to the responder VME module; and
the responder VME module communicating an acknowledge transfer speed signal to the initiator VME module.

39. The computer-readable medium of claim 33, wherein the responder VME module setting to the transfer speed comprises the responder VME module detecting the transfer speed in the training pattern.

40. The computer-readable medium of claim 33, further comprising the responder VME module executing a skew adjustment algorithm upon receipt of the training pattern.

41. The computer-readable medium of claim 33, further comprising the initiator VME module executing a skew adjustment algorithm upon receipt of the echo pattern.

42. The computer-readable medium of claim 33, wherein the training pattern comprises an error detecting algorithm, and wherein the responder VME module executes the error detecting algorithm.

* * * * *